United States Patent Office 3,256,211
Patented June 14, 1966

3,256,211
INTERPOLYMER OF ETHYLENE OXIDE AND AT LEAST ONE DIFFERENT 1,2-ALKYLENE OXIDE
Frederick E. Bailey, Jr., Charleston, Fred N. Hill, South Charleston, and John T. Fitzpatrick, Charleston, W. Va., assignors to Union Carbide Corporation, a corporation of New York
No Drawing. Filed June 5, 1963, Ser. No. 285,583
10 Claims. (Cl. 260—2)

This invention relates to alkylene oxide polymers and to a process for their preparation. In one aspect, this invention relates to solid copolymers of 1,2-alkylene oxides and other epoxides, said copolymers having outstanding physical properties. In a further aspect, this invention relates to water-soluble films comprised of alkylene oxide copolymers, said films being characterized by improved strength, flexibility, elasticity, and other desirable features.

This application is a continuation-in-part of application Serial No. 776,408 entitled "Process for Polymerization of Vicinal Epoxides" by F. E. Bailey, Jr., J. T. Fitzpatrick and F. N. Hill, filed November 26, 1958, and now United States Patent 3,100,750. Application Serial No. 776,408 is itself a continuation-in-part of application Serial No. 687,620 entitled "Ethylene Oxide Copolymers," by F. E. Bailey, Jr., and F. N. Hill, filed October 2, 1957, now abandoned and application Serial No. 587,954 entitled "Polymerization of Epoxides" by F. E. Bailey, Jr., J. T. Fitzpatrick, and F. N. Hill, filed May 29, 1956, now abandoned. Said application Serial No. 687,620 is, in turn, a continuation-in-part of application Serial No. 587,935 entitled "Ethylene Oxide Copolymers," by F. E. Bailey, Jr., and F. N. Hill, filed May 29, 1956, now abandoned. All of the above applications are similarly assigned to the same assignee as the instant application.

In its broad aspect the instant invention is directed to a process for polymerizing 1,2-alkylene oxides, the solid polymers resulting therefrom, and water-soluble films prepared from certain of the aforesaid solid polymers.

Accordingly, one or more of the following objects will be achieved by the practice of this invention. It is an object of this invention to provide a process for polymerizing 1,2-alkylene oxides in contact with a catalytically significant quantity of a polymerization catalyst as hereinafter defined. It is also an object of this invention to provide a novel process for polymerizing an admixture containing two or more different 1,2-alkylene oxides with a catalytically significant quantity of polymerization catalyst as hereinafter defined. A further object of this invention is to prepare solid polymers in accordance with the teachings herein set forth. It is another object of this invention to prepare solid copolymers which contain above about 55 weight percent of ethylene oxide and below about 45 weight percent of a different 1,2-alkylene oxide, based on the total weight of 1,2-alkylene oxides chemically combined in said copolymer. Another object is to prepare solid copolymers which contain above about 55 weight percent of ethylene oxide and below about 45 weight percent of at least one other 1,2-alkylene oxide, based on the total weight of 1,2-alkylene oxides chemically combined in said copolymer. A further object is directed to the preparation of water-soluble films comprised of alkylene oxide copolymers which are characterized by improved strength, flexibility, elasticity, and other desirable features. These and other objects will readily become apparent to those skilled in the art in the light of the teachings herein set forth.

As indicated previously, one aspect of this invention is directed to polymerizing 1,2-alkylene oxides to produce solid polymers. A single 1,2-alkylene oxide or an admixture of at least two different 1,2-alkylene oxides can be employed as the monomeric feed.

The monomeric 1,2-alkylene oxide employed in the polymerization process of this invention can be characterized by the following formula:

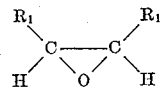

wherein each $R_1$, individually, can be hydrogen, haloaryl, or a hydrocarbon radical free from ethylenic and acetylenic unsaturation such as for example, alkyl, aryl, cycloalkyl, aralkyl, or alkaryl radicals. In addition, both $R_1$ variables can be alkylene radicals which together with the epoxy carbon atoms, i.e., the carbon atoms of the epoxy group,

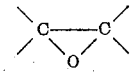

form a saturated cycloaliphatic hydrocarbon nucleus containing from 4 to 10 carbon atoms, preferably from 4 to 8 carbon atoms, for example, cycloalkyl, alkyl-substituted cycloalkyl, cyclobutyl, cyclopentyl, cyclohexyl, cycloheptyl, cyclooctyl, 2-methylcyclopentyl, 3-amylcyclohexyl, and the like. Illustrative $R_1$ radicals include, among others, methyl, ethyl, propyl, butyl, isobutyl, hexyl, isohexyl, 3-propylheptyl, dodecyl, octadecyl, phenyl, halophenyl, chlorophenyl, bromophenyl, benzyl, tolyl, ethylphenyl, butylphenyl, phenethyl, phenylpropyl, cyclopentyl, cyclohexyl, 2-methylcyclohexyl, cycloheptyl, and the like. It is preferred that a lower 1,2-alkylene oxide be employed as starting material in the homopolymerizing reaction. In polymerizing an admixture comprising two different 1,2-alkylene oxides, it is also preferred that one of the 1,2-alkylene oxides be a lower 1,2-alkylene oxide.

Representative 1,2-alkylene oxide monomers which can be employed include, for example, ethylene oxide, propylene oxide, 1,2-butylene oxide, 2,3-butylene oxide, the epoxypentanes, the epoxyhexanes, 2,3-epoxyheptane, nonene oxide, 5-butyl-3,4-epoxyoctane, 1,2-epoxydodecane, 1,2-epoxyhexadecane, 1,2-epoxyoctadecane, 5-benzyl-2,3-epoxyheptane, 4-cyclohexyl-2,3-epoxypentane, chlorostyrene oxide, styrene oxide, ortho-, meta-, and para-ethylstyrene oxide, glycidyl benzene, the oxa-bicycloalkanes, e.g., 7-oxabicyclo[4.1.0]heptane, 6-oxabicyclo-[3.1.0]hexane, 4-propyl-7-oxabicyclo[4.1.0]heptane, 3-amyl-6-oxabicyclo[3.1.0]hexane and other alkyl-substituted oxabicyoloalkanes; and the like.

In one embodiment, the polymers and copolymers of this invention can be prepared by contacting the aforementioned monomers, i.e., 1,2-alkylene oxides, with a catalytically significant quantity of a metal alcoholate.

The metal alcoholates contemplated as catalysts in this embodiment of the instant invention are compounds containing alkaline earth metal, i.e., strontium, calcium, or barium, in which the metal portion is bonded to mono- or polyhydroxy organic compounds, e.g., alkanols, cycloalkanols, alkylene glycols, or phenols, through the hydroxyl oxygen of at least one of the hydroxy groups of said organic compound. Expressed differently, the alkaline earth metal alcoholates can be characterized by the following formula:

(I)     RO—M—OR wherein M is an alkaline earth metal, i.e., strontium, calcium or barium; and wherein each R variable can be considered to be derived from the same or different mono- or polyhydroxy organic compounds. It is to be understood, of course, that when R is a polyhydroxy organic compound, each M valence also can be separately bonded through two different hydroxyl oxygens of the same R atom, i.e.,

in which case R also may or may not have free hydroxyl groups (—OH) attached thereto. It is pointed out, at this time, that the term "exposure activated" alkaline earth metal alcoholates will be employed in this specification, to designate those alkaline earth metal alcoholates which have been exposed to (contacted with) water and carbon dioxide according to the teachings herein set forth.

The organic portion of the alkaline earth metal alcoholates can be derived, for example, from primary, secondary, and tertiary alkanols and cycloalkanols, e.g., methanol, ethanol, n-propanol, isobutanol, n-pentanol, isopentanol, n-hexanol, dodecanol, 2-ethylhexanol, 2,2-dimethyloctanol, benzyl alcohol, 2-phenylethanol, diphenylcarbinol, cyclopentanol, cyclohexanol, 4-butylcyclohexanol, 3-octylcycloheptanol, cycloheptanol, and the like; from di- and poly-hydroxylated aliphatics, e.g., ethylene glycol, propylene glycol, the butanediols, the pentanediols, 2-methyl-2,3-butanediol, 2-ethyl-1,6-hexanediol, 4,5-octanediol, 1,9-nonanediol, glycerol, β-methylglycerol, pentaerythritol, diethylene glycol, dipropylene glycol, dibutylene glycol, dipentylene glycol, dihexylene glycol, and the like; from monoalkyl and monoaryl ethers of mono- and polyalkylene glycols, e.g., 2-methoxyethanol, 2-ethoxyethanol, 2-butoxyethanol, 2-benzyloxyethanol, 3-propoxypropanol, 4-hexoxybutanol, 6-benzyloxyhexanol, 2-(β-methoxyethoxy)ethanol, 2-(β-butoxyethoxy)ethanol, 3-(β-ethoxypropoxy)propanol, 4-(β-hexoxybutoxy)butanol, and the like; from mono- and polyhydroxy-containing aromatic and polyaromatic (including fused aromatic) hydrocarbons, e.g., phenol, resorcinol, catechol, pyrogallol, the cresols, alkyl-substituted phenol, the xylenols, 2,2'-, 2,4'-, 3,3'-, and 4,4'-dihydroxybiphenyl, the naphthols, the naphthalenediols, and the like. The organic portion of the alkaline earth metal alcoholates also can be derived from organic compounds containing both alcoholic hydroxyl and phenolic hydroxyl groups. In addition, the organic portion can contain unreactive groups or groups which do not materially affect the polymerization reaction such as alkoxy, aryloxy, aralkyloxy, alkaryloxy, thio-ether groups, halogen bonded to aromatic carbon, sulfones, aromatic nitro groups, amino groups, and the like.

The catalytic activity of the alkaline earth metal alcoholates can be enhanced upon moderate exposure to carbon dioxide and water. Such exposure results in a weight increase of the alkaline earth metal alcoholate. However, no simple rule of thumb can be given for determining the optimum weight gain necessary to impart maximum catalytic activity to the alcoholate by exposure to carbon dioxide and water since the particular metal alcoholate of choice, its preparation, its surface area, etc., are influencing factors to be considered in each case. It has been observed that alkaline earth metal alcoholates in which the organic portion is derived from lower saturated aliphatic alcohols, e.g., methanol and ethanol, require less exposure (or less weight gain), than is the case when the organic portion is derived from, for example, n-hexanol, 2-butoxyethanol, alkylene glycols, and the like, to provide enhanced catalytic activity. Exposure of one preparation of calcium ethylene glycoxide (prepared in a manner similar to that set out in Example 15) to carbon dioxide substantially saturated with water vapor disclosed that the catalytic activity increased with increase in weight of said glycolate up to a weight gain of about 60 percent; thereafter the catalytic activity began to decrease. However, even after a gain in weight of about 70 percent, the glycoxide was still more active than the unexposed or untreated compound, i.e., calcium ethylene glycoxide. In this particular illustration, the optimum gain in weight was ascertained to be about 45 to 60 percent.

The alkaline earth metal alcoholates can be prepared, for example, by reacting the appropriate alkaline earth metal with the desired hydroxy-containing organic compound. The preparation can be conducted in an inert or substantially inert organic diluent, e.g., dioxane, or in an excess of the hydroxy-containing organic compound itself. It is preferred that the preparation of the alkaline earth metal alcoholates be conducted under an inert atmosphere such as butane, nitrogen, and the like. During the preparation and storage of the alkaline earth metal alcoholates, it is desirable to minimize the presence of carbon dioxide, water, and reactive gases which may come in contact with said alcoholates.

The alkaline earth metal alcoholates in which the organic portion is derived from dihydroxy-containing organic compounds, e.g., ethylene glycol, 1,2-propylene glycol, and the like, can be prepared by reacting the alkaline earth metal per se with the desired dihydroxy-containing organic compound, or, for example, alkaline earth metal methylate with the desired dihydroxy-containing organic compound, preferably in an inert organic diluent. When the latter is employed, it is desirable to heat the reaction medium to a temperature sufficient to remove (in this illustration) the methanol which is given off during the reaction between the alkaline earth metal methylate and the dihydroxy-containing organic compound.

The polymers and copolymers of this invention can also be conveniently prepared by contacting the aforementioned 1,2-alkylene oxide monomers with a catalytically significant quantity of certain divalent metal carbonates, organometallic compounds or amides.

The divalent metal carbonate catalysts are the carbonates of divalent metals which have an atomic number greater than 11 and which are found below potassium and above tin in the Electromotive Force Series of Elements.[1] These divalent metals include magnesium, calcium, strontium, barium, zinc, cadmium, iron, cobalt, nickel, chromium, and manganese. Particularly preferred metal carbonates, from the standpoint of increased catalytic activity and/or ease of preparation in pure form, are the Group IIA metal carbonates, i.e., the calcium strontium or barium carbonates; Group IIB metal carbonates, i.e., the zinc or cadmium carbonates; manganous carbonate; and magnesium carbonate.

The organometallics contemplated as a class of catalysts in the preparation of the copolymers of the instant invention can be characterized by the following formula:

(II)    

wherein M represents a Group II metal in the Periodic Table, for example, beryllium, magnesium, calcium, strontium, barium, zinc, or cadmium; wherein $R_a$ represents a monovalent hydrocarbon radical; and wherein $R_b$ represents hydrogen, halogen, monovalent hydrocarbon radical, a secondary amino radical, or a hydrocarbyloxy radical, and the like.

The monovalent hydrocarbon radicals can be the aliphatic, aromatic, and alicyclic radicals as exemplified by alkyl, cycloalkyl, aryl, alkaryl, aralkyl, and the like. More specifically, illustrative hydrocarbon radicals include, for instance, methyl, ethyl, isopropyl, n-propyl, n-butyl, t-butyl, isobutyl, sec-butyl, amyl, hexyl, isohexyl, 2-ethylhexyl, 3-methylheptyl, the octyls, the dodecyls, the octadecyls, cyclopentyl, cyclohexyl, cycloheptyl, 2-methylcyclopentyl, 2-butylcyclohexyl, 3-methylcycloheptyl, phenyl, benzyl, ortho-, meta-, and para-tolyl, the xylyls, butylphenyl, phenethyl, phenylpropyl, phenylbutyl, naphthyl, trimethylphenyl, 9-fluorenyl, and the like. Illustrative secondary amino radicals encompass, for instance, dimethylamino, diethylamino, di-n-propylamino, N-ethylpropylamino, di-2-ethylhexylamino, N-ethyl-m-toluidino, N-propyl-2,3-xylidino, N-methyl-anilino, N-isopropylbenzylamino, N-phenyl-benzylamino, N-methyl-N-naph-

[1] Handbook of Chemistry and Physics, 38th edition, p. 1660; published by Chemical Rubber Co., Cleveland, Ohio.

thyl amino, and the like. Among the hydrocarbyloxy radicals can be listed, for instance, alkoxy, aryloxy, cycloalkyloxy, and the like, e.g., methoxy, ethoxy, isopropoxy, n-propoxy, n-butoxy, t-butoxy, hexoxy, 2-ethylhexoxy, octoxy, decoxy, dodecoxy, octadecoxy, phenoxy, ortho-, meta-, and para-toloxy, 2-propylphenoxy, butylphenoxy, n-undecylphenoxy, 2-phenethoxy, benxyloxy, cyclopentyloxy, cyclohexyloxy, cycloheptyloxy, alkylcyclohexyloxy, and the like. The halo radicals include chloro, bromo, and iodo.

Illustrative classes of organometallic catalysts which can be employed in the process of the invention include, for example, dialkylzinc, alkylzinc halide, alkylzinc alkoxide dialkylberyllium, alkylberyllium halide, dialkylmagnesium, alkylcadmium halide, diarylzinc, diarylberyllium, diarylmagnesium, alkylmagnesium dialkylamine, alkylcalcium halide, and the like. Specific examples of the organometallic catalysts include, among others, diethylzinc, di-n-propylzinc, di-n-butylzinc, di-2-ethylhexylzinc, diphenylzinc, n-butylzinc butoxide, octylzinc chloride, phenylzinc bromide, dimethylmagesium dipropylmagnesium, propylphenylmagnesium, n-butylmagnesium chloride, diphenylmagnesium, phenylmagnesium chloride, dimethylberyllium diethylberyllium, ethylcalcium iodide, dimethylcadmium, diethylcadmium, dipropylcadmium, diisobutylcadmium, diisoamylcadmium, diethylbarium, diphenylbarium, dibutylbarium, diethylstrontium, butylzinc diethylamide, ethylzinc dipropylamide, and the like.

Another class of organometallics contemplated as a fourth class of catalysts in the preparation of the copolymers of the instant invention can be characterized by the following formula:

(III)    $M—(—OR)_y$ wherein M represents a Group II or III metal in the Periodic Table other than calcium, strontium or barium, for example, beryllium, magnesium, zinc, cadmium, aluminum, and the like; wherein OR is a hydrocarbyloxy radical such as an alkoxy radical preferably having up to 10 carbon atoms inclusive, more preferably 2 to 4; and wherein y is the valency of the metal M.

The hydrocarbyloxy radical of the catalysts is derived from primary, secondary, or tertiary alcohols. Representative alkoxy radicals include, among others, methoxy, ethoxy, n-propoxy, ispropoxy, n-butoxy, isobutoxy, sec-butoxy, t-hexoxy, dodecoxy, octadecoxy, and the like. Illustrative organometallic catalysts include, for example, aluminum triisopropoxide, aluminum tri-t-butoxide, magnesium diisopropoxide, magnesium di-t-butoxide, and the like.

In practice, it has been found desirable to include a promoter in the aforementioned organometallic catalyst systems. For the organometallic catalysts of Formula II, the promoted catalyst system can be dialkyl metal of Group II of the Periodic Chart, e.g., magnesium, zinc, and the like, and a compound containing an active hydrogen. Suitable active hydrogen compounds include water, methanol, ethanol, propanol, n-butanol, phenol, 2,4-pentadione, and acetic acid. For the organometallic catalysts of Formula III, the catalyst system may be composed of an aluminum trialkoxide, e.g., aluminum triisopropoxide, and a zinc halide, such as zinc chloride, zinc bromide, and the like.

A further class of catalysts which are suitable for use in the instant invention encompasses the divalent metal amides, the divalent metal amide-alcoholates, and the modified divalent metal amide catalysts.

The preparation of the metal amides is well-known to the art. For instance, the metal hexammoniates can be prepared by reacting the appropriate metal with liquid ammonia, the resulting product being characterized by the formula $M(NH_3)_6$ wherein M can be calcium, strontium, barium, and the like. The alkaline earth metal amides can be obtained by allowing the corresponding metal hexammoniate to decompose while protecting them from reactive gases and/or vapors such as oxygen, water, and the like. The amides of zinc, cadmium, and barium can also be prepared by the reaction between potassium amide and the bromides of the appropriate metal, the reaction being carried out in liquid ammonia. The reaction of diethylzinc or diethylmagnesium with ammonia gives the corresponding metal amides and ethane as the products. The articles of Bergstrom and Fernelius [2] also disclose various methods for preparing metal amides. The metal amides effective as catalysts in the polymerization reaction are characterized by the formula $H_2N—M—NH_2$ wherein M is magnesium, calcium, zinc, barium, cadmium, or strontium.

The preparation and use of the divalent metal amide-alcoholates and the doubly modified divalent metal amides are disclosed respectively in U.S. Patents 2,971,988 and 2,969,402.

The catalysts hereinabove described are employed in catalytically significant quantities. In general, a catalyst concentration in the range of from about 0.001, and lower, to about 10, and higher, weight percent, based on the weight of total monomeric feed, is suitable. A catalyst concentration in the range of from about 0.01 to about 3.0 weight percent is preferred. A catalyst concentration in the range of from about 0.005 to about 1.0 weight percent is highly preferred. For optimum results, the particular catalyst employed, the nature of the monomeric reagent(s), the operative conditions under which the polymerization reaction is conducted, and other factors will largely determine the desired catalyst concentration.

The polymerization reaction can be conducted at a temperature in the range of from about 0°, and lower, to about 200° C., and preferably from about 35° to about 150° C. As a practical matter, the choice of the particular temperature at which to effect the polymerization reaction depends, to an extent, on the nature of the 1,2-alkylene oxide employed, the particular catalyst employed, the concentration of the catalyst, and the like.

In general the reaction time will vary depending on the operative temperature, the nature of the 1,2-alkylene oxide employed, the particular catalyst and the concentration employed, the use of an inert organic diluent, and other factors. The reaction time can be as short as a few hours, or shorter, in duration or it can be as long as several days. A feasible and suitable reaction period is from about 5 hours, and lower, to about 100 hours, and longer.

When polymerizing an admixture containing two different 1,2-alkylene oxides, the proportions of said 1,2-alkylene oxides can vary over a wide range. Preferably the concentration of either monomeric 1,2-alkylene oxide is in the range of from about 5 to about 95 weight percent, and higher, based on the total weight of said 1,2-alkylene oxides. In a preferred aspect the novel solid copolymer products contain above about 55 weight percent ethylene oxide and below about 45 weight percent of a second 1,2-alkylene oxide, based on the total weight of said ethylene oxide and said different 1,2-alkylene oxide chemically combined in said copolymer. More desirably still, the novel solid copolymer products contain above about 55 and upwards to about 95 weight percent, and higher, ethylene oxide and below about 45 and downwards to about 5 weight percent and lower, of a different 1,2-alkylene oxide, based on the total weight of said ethylene oxide and said different 1,2-alkylene oxide chemically combined in said copolymer.

The polymerization reaction takes place in the liquid phase and a pressure above atmospheric may be employed to maintain the liquid phase. However, in the usual case, external pressure is unnecessary, and it is only necessary to employ a reaction vessel capable of withstanding the autogenous pressure of the reaction mixture. It is high-

---

[2] Chem. Revs. 12, 43 (1933); Chem. Revs. 20, 413 (1937).

ly desirable to conduct the polymerization reaction under substantially anhydrous conditions.

The polymers of this invention can be prepared via the bulk polymerization, suspension polymerization, or the solution polymerization routes. The polymerization reaction can be carried out in the presence of an inert organic diluent such as, for example, aromatic solvents, e.g., benzene, toluene, xylene, ethylbenzene, chlorobenzene, and the like; various oxygenated organic compounds such as anisole, the dimethyl and diethyl ethers of ethylene glycol, of propylene glycol, of diethylene glycol and the like; normally liquid saturated hydrocarbons including the open chain, cyclic, and alkyl substituted cyclic saturated hydrocarbons such as pentane, hexane, heptane, various normally-liquidpetroleum hydrocarbon fractions, cyclohexane, and alkylcyclohexanes, decahydronaphthalene, and the like.

An induction period may be observed in that the polymerization is not initiated immediately. The induction period can be as short as or shorter than minutes in length with the more active catalysts or it can be several hours in duration. This induction period depends, for example, on the individual catalyst employed, its preparation, its surface area, the nature of the monomeric feed; the reaction temperature, the purity of the monomeric feed, and other factors. Certain impurities which may be present in the 1,2-alkylene oxide(s) have an inhibiting effect on the polymerization reaction, these impurities being carbon dioxide, oxygen, aldehydes, and water. In particular, the inhibiting effect of water and oxygen appears in prolongation of the induction period prior to the initiation of the polymerization reaction. Small amounts of these impurities can be tolerated; however, it is highly advantageous to employ high purity reagents, catalyst, etc., thus avoiding inordinately prolonged induction periods.

Unreacted 1,2-alkylene oxide oftentimes can be recovered from the reaction product by conventional techniques such as by distillation. The polymer product can be further purified by washing with an inert organic diluent in which the polymer product is insoluble. Another route involves dissolution in a first inert organic solvent, followed by addition of a second inert organic solvent which is miscible with the first solvent but which is a non-solvent for the polymer product, thus precipitating the polymer product. The precipitated polymer can be recovered by filtration, decantation, etc., followed by drying same under reduced pressure at slightly elevated temperatures.

The copolymers of this invention have a reduced viscosity of at least 0.5, more preferably at least 1.5 and still more preferably from about 2 to about 30, and higher, as measured at a concentration of 0.2 gram of said copolymer in 100 milliliters of acetonitrile or suitable solvent at 30° C. The reduced viscosity values of the copolymers were determined at a concentration of 0.2 gram of the copolymer per 100 milliliters of acetonitrile at 30° C., unless indicated otherwise.

The solid homopolymers prepared in accordance with the teachings of this invention are a useful class of compounds. The ethylene oxide polymers are hard, firm, tough and resinous in character, and they have a reduced viscosity value of from about 1.0 to 25, and higher, in acetonitrile. The ethylene oxide polymers appear to form homogeneous systems with water in all proportions. Although the higher molecular weight ethylene oxide polymers merely swell on the addition of small amounts of water, on the addition of greater amounts of water these polymers pass into solution. The water solutions are viscous, the viscosity increasing both with the concentration of the polymer and the molecular weight of the polymer. The ethylene oxide polymers show little change in melting point with increased molecular weight and the melting point, as measured by change in stiffness with temperature, is found to be about 65°±2° C. throughout the range of reduced viscosity values of from 1 to 25, and greater (in acetonitrile). Resinous poly(ethyleneoxide), upon X-ray examination, exhibits a crystalline structure. The crystallization temperature, as determined by measuring the break in the cooling curve, is about 55° C. The ethylene oxide polymers are soluble in water, acetonitrile, chloroform, acetic acid, and mixtures of water and higher saturated aliphatic alcohols. The ethylene oxide polymers are insoluble in glycerol and normally liquid saturated aliphatic hydrocarbons.

Unlike resinous poly(ethylene oxide) which is water-soluble, poly(propylene oxide) is water-insoluble. Crude poly(propylene oxide) is obtained as a stiff, rubbery semi-solid, often containing a sizeable portion of crystalline poly(propylene oxide). This crystalline fraction can be separated from the crude polymeric product by dissolving said crude product in hot acetone and then chilling to temperatures of the order of −20° C. to −40° C. to precipitate the crystalline polymer. The crystalline propylene oxide polymers are water-insoluble, firm, tough solids, and they may have a reduced viscosity value of above 1.0 in benzene.

The practice of the instant invention also lends itself to the production of solid homopolymers of other 1,2-alkylene oxides such as, for example, poly(butylene oxide), poly(pentylene oxide), poly(styrene oxide), and the like.

The copolymers of this invention can be water-soluble or water-insoluble solid compositions depending upon the ratio of the chemically combined monomeric content therein. In general, those copolymers containing a minor proportion, e.g., less than about 50 weight percent, of ethylene oxide copolymerized therein are generally hard, tough, water-insoluble compositions. However, it is generally observed that the copolymers containing greater than about 50 weight percent of ethylene oxide chemically combined in said copolymers, tend to be water-soluble, and this water-solubility as well as hardness and toughness increases as the ethylene oxide content of the resulting copolymer increases. Thus, the instant invention is admirably suited for the preparation of "tailor-made" solid copolymers which have characteristics and properties built into said copolymers; consequently, resinous copolymers covering a spectrum of mechanical properties can be obtained with characteristics that are highly desirable in various fields of applications and uses.

The polymers of this invention have a variety of uses. The resinous polymers are useful for the production of various shaped articles, e.g., buttons, brush handles, lamp bases, etc. Resinous ethylene oxide polymers are useful as sizing agents, coagulants, and water-soluble lubricants. The water-soluble and water insoluble solid polymers are also useful in the preparation of films by conventional techniques such as by milling on a two-roll mill, calendering, solvent casting, and the like. The homopolymers of the lower 1,2-alkylene oxides and the copolymers containing a lower 1,2-alkylene oxide as a comonomer are preferred polymeric classes. Those copolymers containing ethylene oxide, and in particular above about 55 weight percent ethylene oxide, are especially preferred copolymeric classes.

A particularly preferred embodiment of this invention relates to water soluble films and extruded, molded, and other shaped articles comprised of alkylene oxide copolymers. The water soluble films in particular, are characterized by improved flexibility, elasticity, strength, resistance to stress-cracking, and resistance to whitening on cold drawing. Moreover, films prepared from the aforesaid copolymers have good physical properties in the longitudinal and transverse directions, are resistant to penetrating impact, are easily heat sealed, and possess a high degree of elasticity without permanent set. In contrast, films prepared from ethylene oxide homopolymers tend to whiten on being stretched, have poor resistance to penetrating impact, imbalance of properties in the longitudinal and transverse direction, and low elasticity. Although in the latter instance the physical properties of the film can be improved or enhanced by the addition thereto of suitable additives, the overall film properties resulting therefrom are largely unsatisfactory for commercial use. In the instant embodiment it has been found that ethylene oxide copolymers containing relatively small amounts of other alkylene oxides yield films which exhibit none of the deficiencies noted above for the ethylene oxide homopolymers. These novel ethylene oxide copolymers are easily fabricated into films which are free from stress-cracking without the need for external plasticization.

Heretofore, water soluble films have been prepared from both polymeric and non-polymeric materials such as, for example, poly(vinyl alcohol), methyl cellulose, and the like. However, deficiencies of one type or another in the overall film properties have limited wide scale commercialization and acceptance of these products. For example, it is known that films prepared from poly(vinyl alcohol) are difficult to heat seal and dissolve quite slowly in water. Moreover, the poly(vinyl alcohol) films can be produced only by casting which is a more expensive method than the calendering, extrusions, and molding techniques, which can be employed with the water soluble thermoplastic resins. Similarly, films composed of methyl cellulose are very difficult to heat seal, dissolve at a rather slow rate, and also must be fabricated by the casting technique. In contrast, the novel copolymeric films of this embodiment of the invention are readily heat sealed, dissolve in water, and can be produced by inexpensive techniques.

In general, ethylene oxide can be copolymerized with one or more alkylene oxides which are capable of improving the physical properties of the water-soluble film, or other articles prepared therefrom, without adversely affecting the particular polymerization catalyst chosen. Suitable alkylene oxides which can be polymerized with ethylene oxide to yield polymers suitable for use in the production of water-soluble films include among others, propylene oxide, butylene oxide, styrene oxide, vinyl cyclohexane dioxide and the like. While ethylene oxide can be copolymerized with any of the aforesaid alkylene oxide comonomers, it is important that the comonomers do not contain substituents which are incompatable with the particular polymerization catalyst employed. Examples of substituent groups which do not affect the catalysts are alkylaryl, unreactive halogen, cycloalkyl, alkaryl, aralkyl, alkylene, heterocyclic sulfide, ethylene, siloxyl, and tertiary amine groups. It has been observed that the tertiary amine groups are particularly adavntageous in that they impart improved stability to the copolymers and hence better durability to the films and molded articles prepared therefrom.

It has been further discovered that the physical properties of the aforesaid copolymer films vary with the particular alkylene oxides chosen for copolymerization with the ethylene oxide. It is thus possible to impart selected properties to the copolymer by proper choice of the alkylene oxide comonomer. This selectivity permits the film properties to be tailored to the specific intended use of the water soluble film. For instance, it has been observed that a small amount of propylene oxide, i.e., about 5 percent, when copolymerized with ethylene oxide produces a polymer having increased elasticity. In contrast, the use of a similar amount of styrene oxide yields a polymer that is less elastic, but has enhanced ultimate strength. Moreover, the styrene oxide imparts a particular good balance of tensile properties in the longitudinal and transverse directions and increases the resistance of the film to penetrating impact. Films prepared from either of the aforesaid copolymers are free from stress-cracking and exhibit little or no tendency to whiten on stretching. The outstanding advantages attributed to the individual comonomers can be utilized simultaneously in the same film by copolymerizing two or more of the alkylene oxide comonomers with the ethylene oxide to form a terpolymer, quadripolymer, and the like. The particular choice and the number of comonomers employed will be governed, in part, by the desired melting properties, melting point, rate of water solubility, and other considerations. The novel polymers encompassed by this embodiment of the instant invention are those comprised of, in polymerized form, from about 90 to about 99 weight percent ethylene oxide and from about 1 to about 10 weight percent of at least one different 1,2-alkylene oxide, based on the total weight of ethylene oxide and 1,2-alkylene oxide chemically combined in the polymer. Preferred polymers are those comprised of from about 90 to about 99 weight percent ethylene oxide and the balance of at least two different 1,2-alkylene oxides. A particularly preferred polymer is that comprised of from about 90 to about 99 weight percent ethylene oxide, and the remainder butylene oxide and styrene oxide, preferably in equal amounts, i.e., from about 0.5 to about 5 weight percent. It has been observed that copolymers comprised of less than 90 weight percent ethylene oxide, have softening points and handling properties below that necessary for film fabrication. In contrast, ethylene oxide-butylene oxide copolymers and ethylene oxide-butylene oxide-styrene oxide terpolymers wherein the ethylene oxide comprises at least 90 weight percent of the polymer, are easily fabricated into films and other articles which exhibit improved stress crack resistance, durability and other properties.

The novel copolymers of this embodiment of the instant invention, i.e., the polymers obtained by the copolymerization of ethylene oxide with one or more alkylene oxides, as hereinbefore defined, can be processed into films, sheets, and molded articles in a variety of ways. Inasmuch as the copolymers are thermoplastic, the known prior art methods of calendering, molding, extrusion and the like, can be employed. The calendered and extended films may be further modified, if desired, by orienting, tentering, cold-rolling, embossing and the like.

Additionally, other additives can be incorporated into the film during fabrication, such as, for example, ultraviolet screening agents, plasticizers, pigments, dyes, antistatic agents, antioxidants, and the like. In a particularly preferred aspect, films and other articles which have incorporated therein small proportions of phenothiazine maintain their physical properties for longer periods of time than articles without the additive. The concentration of phenothiazine is preferably from about 0.01 to about 6.0 and more preferably from about 0.1 to about 5.0 parts per hundred parts of copolymer.

It has also been observed that when the copolymers are processed into films, sheets, or molded articles by the aforementioned thermoplastic methods, i.e., calendering, extrusion and the like, the molecular weight of the copolymer is critical if satisfactory products are to be obtained. While the overall operable molecular weight range, as expressed in terms of reduced viscosity, is from 1.0 to about 25 and higher, the optimum range will vary with the particular processing technique employed. For example, the optimum reduced viscosity range for extrusion is from about 1 to about 6, while for fabricating by calendering, the optimum range is from about 2 to about 13. With copolymers prepared from solution casting, the effect of molecular weight on processing technique is less critical and a reduced viscosity range of from 1.0 to about 25 and higher is satisfactory.

In various illustrative examples below, the procedure employed, unless noted otherwise, to prepare the polymer was as follows. A 9-inch Pyrex tube 22 mm. in diamter was sealed at one end; the other end of the tube was fitted with a 3-inch piece of 8 mm. Pyrex tubing. The tube was cleaned, dried and flushed with dry nitrogen; a weighed quantity of catalyst was then introduced into the tube. The monomeric mixture was charged to the tube in a "dry box" containing a nitrogen atmosphere.

The tube was then closed with a rubber cap, followed by cooling in Dry Ice-acetone bath; the tube was sealed under the vacuum thus obtained. The sealed tube was subsequently inserted into an aluminum block or placed in a constant-temperature bath, said aluminum block (or tube) being agitated by rocking at the desired operating temperature for a given period of time. After this, the tube was broken open and the reaction product was placed in a vacuum, e.g., about 10 to 30 mm. of Hg at 30°–40° C., until dried. In various other examples, the polymerization reaction was conducted in a two-liter, stainless steel stirred autoclave.

*Example 1*

Calcium metal (20 grams of purified turnings) was dissolved in 1500 cc. of liquid ammonia in a 3-liter Erlenmeyer flask. Propylene glycol (38 grams) was dissolved in 500 cc. of liquid ammonia and this solution was slowly added to the solution of calcium metal in liquid ammonia. After this, the mixture of these two solutions was allowed to stand for about 1 hour at room temperature, followed by pouring the mixture into a Pyrex dish which was exposed to the atmosphere. After the ammonia had evaporated from the contents on said dish, the resulting product was sieved.

Two small glass tubes were each charged with 20 mg. of the above-prepared calcium-containing catalyst together with 20 grams of ethylene oxide and 45 grams of toluene. The tubes were sealed and gently agitated in a bath maintained at 115° C. for 16 hours. 70–80 percent yield of polymer was obtained which had a reduced viscosity value of 5 (in acetonitrile).

*Example 2*

Strontium metal (50 grams, cut into small pieces) was placed in a 2-liter creased flask equipped with stirrer, nitrogen inlet and vent, condenser and feed tank. The contained strotium metal was washed with 150 cc. of high purity methanol. The flask was then purged with nitrogen. The wash methanol was removed from the flask by suction and discarded. Fresh methanol (600 cc.) was added to the strontium metal with stirring. The ensuing reaction was complete in about 2 hours after which period of time the flask was transferred to a "dry box" in which was maintained a nitrogen atmosphere. The strontium methylate precipitate was recovered by filtration. This precipitate was bottled under a nitrogen atmosphere and used in the following preparation of poly(ethylene oxide).

Two small glass tubes were each charged with 20 mg. of the above-prepared strontium methylate together with approximately 30 grams of ethylene oxide. The tubes were sealed and then placed in a water bath which was maintained at 100° C.; the sealed tubes were gently agitated for a period of 16 hours while in the water bath. The yield of polymer was 95–98 percent. This polymer has a reduced viscosity in acetonitrile of 3.0.

*Example 3*

Calcium metal (20 grams of purified turnings) was dissolved in 1500 ml. of liquid ammonia. Ethylene glycol (37 grams) was dissolved in 500 ml. of liquid ammonia and this solution was slowly added to the solution of calcium metal in liquid ammonia. After this, the mixture of these two solutions was allowed to stand for about two hours, followed by pouring the mixture into a large, flat Pyrex dish which was exposed to the atmosphere. After the ammonia had evaporated from the contents on said dish (a period of approximately 20 hours), the resulting product was sieved and bottled under a nitrogen atmosphere.

Two small glass tubes were each charged with 30 mg. of the above-prepared calcium-containing catalyst together with approximately 30 grams of ethylene oxide. The tubes were sealed and gently agitated in a bath, maintained at 100° C., for 20 hours. The conversion of monomer to polymer was essentially quantative and the resulting polymer had a reduced viscosity of 7 in acetonitrile.

*Example 4*

Two small tubes were each charged with the calcium-containing catalyst prepared in Example 3 together with propylene oxide such that the resulting admixture contained 0.3 weight percent catalyst, based on the weight of propylene oxide. The tubes were sealed and gently agitated in a water bath, maintained at 85° C., for one week. In each instance the yield of polymer was approximately 50 percent. The reduced viscosity values of the polymeric products were 1.5 and 2.0, respectively, in benzene. A sample of the polymer which had a reduced viscosity value of 2.0 was examined by X-ray diffraction and found to be partially crystalline. Fractionation of these samples by precipitation from chilled acetone yielded crystalline poly(propylene oxide).

*Example 5*

To a glass tube containing barium methylate there was charged ethylene oxide in an amount so as to give an admixture containing 0.02 weight percent barium methylate, based on the weight of ethylene oxide. The tube was sealed and then inserted into an aluminum block which was gently agitated for a period of 84 hours at 100° C. The yield of polymer was 75 percent. This polymer had a reduced viscosity value of 13.1 in acetonitrile.

*Example 6*

To a glass tube containing barium ethylate there was charged ethylene oxide in an amount so as to give an admixture containing 0.06 weight percent barium ethylate, based on the weight of ethylene oxide. The tube was sealed and then inserted into an aluminum block which was gently agitated for a period of 16 hours at 100° C. A 30 percent yield of polymer was obtained. This polymer had a reduced viscosity value of 1.4 in acetonitrile.

*Example 7*

To a glass tube containing barium salt of t-butylcatechol there was charged ethylene oxide in an amount so as to give an admixture containing 0.03 weight percent barium t-butylcatecholate, based on the weight of ethylene oxide. The tube was sealed and then inserted into an aluminum block which was gently agitated for a period of 18 hours at 100° C. A 20 percent yield of polymer was obtained which had a reduced viscosity value of 1.1 in acetonitrile.

*Example 8*

Barium metal (5 grams), octylphenol (14 grams), and 100 grams of dry methanol were placed in a flask and refluxed for 2 hours. The reaction product was stripped at 150° C. under 10 mm. of mercury. The resulting crude product was ground in a mortar and screened, under a nitrogen atmosphere.

To a glass tube containing the above-prepared barium octylphenoxide there was charged ethylene oxide in an amount so as to give an admixture containing 0.03 weight percent barium octylphenoxide, based on the weight of ethylene oxide. The tube was sealed and then inserted into an aluminum block which was gently agitated for a period of 18 hours at 100° C. The polymer yield was 20 percent. This polymer had a reduced viscosity value of 2.4 in acetonitrile.

*Example 9*

To a glass tube containing as catalyst the strontium salt of 2-ethoxyethanol there was charged ethylene oxide in an amount so as to give an admixture containing 0.07 weight percent catalyst, based on the weight of ethylene oxide. The tube was sealed and then inserted into an aluminum block which was gently agitated for a period of 20 hours at 100° C. A 10 percent yield of polymer was obtained. This polymer had a reduced viscosity value of 2.5 in acetonitrile.

Example 10

To a glass tube containing strontium glycoxide there was charged ethylene oxide in an amount so as to give an admixture containing 0.07 weight percent strontium glycoxide, based on the weight of ethylene oxide. The tube was sealed and then inserted into an aluminum block which was gently agitated for a period of 16 hours at 100° C. A 10 percent yield of polymer was obtained. This polymer had a reduced viscosity of 1.0 in acetonitrile.

Example 11

To a glass tube containing barium methylate there was charged ethylene oxide in an amount so as to give an admixture containing 0.1 weight percent barium methylate, based on the weight of ethylene oxide. The tube was sealed and then inserted into an aluminum block which was gently agitated for a period of 23 hours at 80° C. The conversion of monomer to polymer was essentially quantitative and the resulting polymer had a reduced viscosity value of 2.8 in acetonitrile.

Example 12

To a glass tube containing calcium methylate there were charged equal parts of weight of ethylene oxide and toluene in an amount so as to give an admixture containing 0.5 weight percent calcium methylate, based on the weight of ethylene oxide. The tube was sealed and then inserted into an aluminum block which was gently agitated for a period of 45 hours at 100° C. The yield of polymer 20 percent. This polymer had a reduced viscosity value of 1.2 in acetonitrile.

Example 13

To a glass tube containing barium glycoxide there were charged equal parts by weight of ethylene oxide and toluene in an amount so as to give an admixture containing 1.0 weight percent barium glycoxide, based on the weight of ethylene oxide. The tube was sealed and then inserted into an aluminum block which was gently agitated for a period of 7 hours at 80° C. The conversion of monomer to polymer was essentially quantitive and the resulting polymer had a reduced viscosity value of 2.8 in acetonitrile.

Example 14

To a glass tube containing barium phenoxide there were charged equal parts by weight of ethylene oxide and toluene in an amount so as to give an admixture containing 0.3 weight percent barium phenoxide, based on the weight of ethylene oxide. The tube was sealed and then inserted into an aluminum block which was gently agitated for a period of 16 hours at 100° C. The yield of polymer was 80 percent. This polymer had a reduced viscosity value of 2.2 in acetonitrile.

Example 15

Calcium metal (10 grams) is dissolved in 350 milliliters of liquid ammonia. To the resulting solution there is slowly added a solution of 15.5 grams of ethylene glycol in 350 milliliters of liquid ammonia under continuous stirring. Subsequently, the ammonia is allowed to weather off for a period of 16 to 18 hours. The resulting grayish-white product is pulverized, under a nitrogen atmosphere, to a finely divided powdery state. This powdery product is spread on a petri dish which is then inserted into a desiccator. Moist carbon dioxide, generated by bubbling carbon dioxide through a water bubbler, is then introduced into the desiccator via a gas inlet conduit, said desiccator being maintained at about 25° C. The powdery product is exposed to this treatment for 3 to 4 hours until there is a weight increase of between about 46 to 56 percent in said powdery product. Subsequently, said exposed product is placed under vacuum (3 to 5 mm. of Hg) at a temperature of 57° C. for a period of about 2 to 3 hours until there is a weight loss of about 18 to 26 percent. The "exposure activated" calcium ethylene glycoxide thus produced is catalytically active.

Example 16

Strontium metal (22 grams) was dissolved in 500 milliliters of liquid ammonia. To the resulting solution there was slowly added a solution of 16 grams of ethylene glycol in 200 milliliters of liquid ammonia under continuous stirring. Subsequently, the ammonia was allowed to weather off for a period of 16 to 18 hours until dry, grayish-white product remained. The resulting product, strontium glycoxide, was pulverized to a finely divided powdery state under a nitrogen atmosphere, and subsequently, this powdery product was divided into several portions. Each portion except the control was individually placed into a desiccator and moist carbon dioxide, generated by bubbling carbon dioxide through a water bubbler, was introduced into the desiccator (maintained at approximately 25° C.) for varying periods of time. These "exposure activated" strontium glycoxides were catalytically active. Other pertinent data are disclosed in Table I below.

TABLE I

| Sample Number | Catalyst [1] | Exposure Time, Hours | Weight Percent Gain [2] |
|---|---|---|---|
| 1 | Strontium glycoxide | 0.00 | |
| 2 | do | 0.25 | 7.5 |
| 3 | do | 0.5 | 10.9 |
| 4 | do | 1.0 | 19.1 |
| 5 | do | 2.0 | 40.4 |
| 6 | do | 3.0 | 46.5 |
| 7 | do | 5.0 | 53.6 |
| 8 | do | 5.5 | 58.6 |

[1] Exposed to moist carbon dioxide as indicated.
[2] Based on the weight of strontium glycoxide prior to exposure to moist carbon dioxide.

Example 17

Barium metal (34.4 grams) was dissolved in 1000 milliliters of liquid ammonia. To the resulting solution there was slowly added a solution of 37.1 grams of n-butanol in 300 milliliters of liquid ammonia under continuous stirring. Subsequently, hte ammonia was allowed to weather off for a period of 16 to 18 hours until dry, grayish-white product remained. The resulting product, barium n-butylate, was pulverized to a finely divided powdery state under a nitrogen atmosphere, and subsequently, this powdery product was divided into several portions. Each portion except the control was individually placed into a desiccator and moist carbon dioxide, generated by bubbling carbon dioxide through a water bubbler, was introduced into the desiccator (maintained at approximately 25° C.) for varying periods of time. These "exposure activated" barium n-butylates were catalytically active. Other pertinent data are disclosed in Table II below.

TABLE II

| Sample Number | Catalyst [1] | Exposure Time, Hours | Weight Percent Gain [2] |
|---|---|---|---|
| 1 | Barium butylate | 0.00 | |
| 2 | do | 0.17 | 8.6 |
| 3 | do | 0.5 | 7.1 |
| 4 | do | 0.00 | |
| 5 | do | 0.08 | 14 |

[1] Exposed to moist carbon dioxide as indicated.
[2] Based on the weight of barium butylate prior to exposure to moist carbon dioxide.

Example 18

Calcium metal (20 grams) was dissolved in 1500 milliliters of liquid ammonia. To the resulting solution there was slowly added a solution of 31.4 grams of ethylene glycol in 400 milliliters of liquid ammonia under continuous stirring. Subsequently, the ammonia was allowed to weather off for a period of 16 to 18 hours until a dry, grayish-white product remained. The resulting product, calcium glycoxide, was pulverized to a finely divided powdery state under a nitrogen atmosphere, and subsequently, this powdery product was divided into several portions. Each portion except the control was individually placed into a desiccator and moist carbon dioxide, generated by bubbling carbon dioxide through a water bubbler, was introduced into the desiccator (maintained at approximately 25° C.) for varying periods of time. These "exposure activated" calcium glycoxides were catalytically active. Other pertinent data are disclosed in Table III below.

TABLE III

| Sample Number | Catalyst[1] | Exposure Time, Hours | Weight Percent Gain[2] |
|---|---|---|---|
| 1 | Calcium glycoxide | 0.00 | |
| 2 | do | 0.08 | 6.3 |
| 3 | do | 0.17 | 13.6 |
| 4 | do | 0.5 | 22.6 |
| 5 | do | 1.0 | 26.0 |
| 6 | do | 3.0 | 57.8 |
| 7 | do | 4.0 | 75.0 |
| 8 | do | 3.0 | 64.8 |

[1] Exposed to moist carbon dioxide as indicated.
[2] Based on the weight of calcium glycoxide prior to exposure to moist carbon dioxide.

Example 19

In this example various experiments were conducted in which several 30 gram admixtures of ethylene oxide and propylene oxide were copolymerized in the presence of the "exposure-activiated" calcium glycoxide catalyst prepared as set forth in Example 15 supra. The reduced viscosity values of the resulting copolymer products were determined in acetonitrile. The pertinent data and results are set forth in Table IV below.

TABLE IV

| Wt. Percent Propylene Oxide | Temp., °C. | Wt. Percent Catalyst[1] | Reaction Time, Hrs. | Yield, Grams | Reduced Viscosity |
|---|---|---|---|---|---|
| 5 | 90 | 0.2 | 41.5 | 30 | 1.5 |
| 10 | 90 | 0.2 | 41.5 | 30 | 1.7 |
| 10 | 90 | 0.1 | 22.8 | 30 | 4.3 |
| 15 | 90 | 0.2 | 41.5 | 30 | 0.8 |
| 20 | 90 | 0.2 | 147 | 27 | 2.3 |
| 20 | 90 | 0.2 | 18.5 | 30 | 1.2 |
| 20 | 90 | 0.1 | 22.8 | 30 | 3.8 |
| 25 | 90 | 0.2 | 95 | 29 | 0.8 |
| 40 | 90 | 0.2 | 147 | 24 | 2.3 |
| 60 | 90 | 0.2 | 90 | 30 | 0.6 |

[1] Based on the total weight of monomeric feed.

Example 20

Two experiments were conducted in which two 30 gram admixtures of ethylene oxide and isobutylene oxide were copolymerized in the presence of 0.3 weight percent, based on the total weight of monomeric charge, of the "exposure activated" calcium glycoxide catalyst prepared as set forth in Example 15 supra. The reduced viscosity value of the resulting copolymer products were determined in acetonitrile. The pertinent data and results are set forth in Table V below.

TABLE V

| Wt. Percent Isobutylene Oxide | Temp., °C. | Reaction Time, Hrs. | Yield, Grams | Reduced Viscosity |
|---|---|---|---|---|
| 10 | 90 | 47 | 30 | 1.3 |
| 20 | 90 | 47 | 9 | 0.94 |

Example 21

In this example various experiments (with one exception) were conducted in which several 30 gram admixtures of ethylene oxide and styrene oxide were copolymerized in the presence of 0.3 weight percent, based on the total weight of monomeric charge, of the "exposure-activated" calcium glycoxide catalyst prepared as set out in Example 15 supra. The reduced viscosity values of the resulting copolymer products were determined in acetonitrile. The pertinent data and results are set forth in Table VI below.

TABLE VI

| Wt. Percent Styrene Oxide | Temp., °C. | Reaction Time, Hrs. | Yield, Grams | Reduced Viscosity |
|---|---|---|---|---|
| 10 | 90 | 10.5 | 2 | 1.3 |
| 20 | 90 | 23 | 8 | 1.2 |
| 20 | 90 | 17 | 3 | 1.8 |
| [1] 40 | 90 | 23 | 3 | 0.5 |

[1] In this run 4 grams of styrene oxide and 6 grams of ethylene oxide were copolymerized in the presence of 20 grams of toluene.

Example 22

To a glass tube containing the "exposure activated" calcium glycoxide catalyst prepared as set forth in example 15 supra, there were charged 1.5 grams of cyclopentene oxide and 28.5 grams of ethylene oxide so as to give an admixture containing 0.3 weight percent catalyst, based on the total weight of monomeric charge. The tube was sealed and then inserted into an aluminum block which was gently agitated for a period of 44.7 hours at 90° C. The yield of polymer was 6 grams. This polymer had a reduced viscosity value of 2.15 in acetonitrile.

Example 23

In this example the copolymerization was carried out in a 2-liter stainless steel stirred autoclave. The charge of ethylene oxide plus the epoxide comonomer was 270 grams the weight of the toluene diluent was 572 grams. The monomers and diluent were charged to the sealed autoclave together with 6.54 weight percent butane, based on the weight of ethylene oxide. A weighed quantity of catalyst, based on the total weight of monomeric feed, was charged into the sealed autoclave. The polymerization reaction was conducted under agitation. In Table VII below, the reaction temperature was maintained at about 100°–110° C.; in Table VIII below, the reaction temperature was approximately 110° C. Addition of heptane to the reaction product resulted in the precipitation of the polymer product; the polymer product was recovered by filtration and dried under vacuum at slightly elevated temperatures. The pertinent data and results are set forth in Tables VII and VIII below.

TABLE VII

| Wt. Percent Propylene Oxide | Wt. Percent Catalyst | Reaction Time, Hrs. | Yield, Grams | Reduced Viscosity |
|---|---|---|---|---|
| 5 | 0.1 | 18 | 27 | 0.5 |
| 5 | 0.3 | 22 | 75 | 0.8 |
| 5 | 0.2 | 19 | 60 | 1.1 |
| 5 | 0.5 | 18 | 206 | 2.9 |
| 10 | 0.2 | 18 | 41 | 0.6 |
| 10 | 0.2 | 17 | 28 | 0.75 |
| 10 | 0.2 | 17.5 | 77 | 3.2 |
| 15 | 0.5 | 17 | 42 | 0.7 |
| 15 | 0.5 | 18 | 92 | 0.58 |
| 15 | 0.5 | 16 | 103 | 0.59 |
| 20 | 0.3 | 20.5 | 53 | 0.7 |
| 20 | 0.5 | 18 | 90 | 1.1 |
| 20 | 0.5 | 18 | 181 | 1.8 |
| 30 | 0.5 | 20.5 | 213 | 1.5 |
| 30 | 0.5 | 18 | 213 | 1.5 |
| 50 | 0.5 | 17.5 | 65 | 0.83 |
| 50 | 0.5 | 18 | 60 | 0.68 |

TABLE VIII

| Comonomer | Wt. Percent Comonomer [1] | Wt. Percent Catalyst | Reaction Time, Hrs. | Yield, Grams | Reduced Viscosity |
|---|---|---|---|---|---|
| Butylene oxide [2] | 5 | 0.5 | 18 | 132 | 0.97 |
| Do [2] | 20 | 0.5 | 23.75 | 109 | 0.89 |
| Do [2] | 40 | 0.5 | 18 | 50 | 0.54 |
| Cis 2,3-epoxybutane | 5 | 0.5 | 15.25 | 260 | 0.7 |
| Do | 5 | 0.3 | 18 | 170 | 0.92 |
| Do | 15 | 0.5 | 22 | 270 | 0.54 |
| Do | 15 | 0.3 | 17.5 | 200 | 0.64 |
| Trans 2,3-epoxybutane | 5 | 0.5 | 17.25 | 249 | 0.85 |
| Do | 5 | 0.3 | 17 | 226 | 1.78 |
| Do | 15 | 0.3 | 23 | 201 | 0.70 |
| 1,2-epoxybutane | 5 | 0.3 | 17.75 | 230 | 2.41 |
| Do | 15 | 0.3 | 18 | 203 | 0.98 |
| Styrene oxide | 5 | 0.5 | 16.5 | 205 | 1.3 |
| Do | 5 | 0.3 | 21 | 59 | 0.7 |
| Do | 15 | 0.5 | 16.75 | 95 | 0.5 |
| Do | 15 | 0.3 | 21 | 78 | 0.6 |
| Do | 15 | 0.3 | 40.75 | 197 | 0.94 |
| Do | 30 | 0.3 | 18 | 143 | 0.5 |
| Do | 30 | 0.3 | 16.75 | 169 | 1.25 |
| Cyclohexene oxide | 5 | 0.3 | 41.3 | 248 | 1.42 |
| Do | 15 | 0.3 | 42.5 | 119 | 1.45 |
| 4-methyl 2,3-epoxypentane | 20 | 0.5 | 17 | 94 | 0.78 |

[1] Based on the total weight of monomeric feed.
[2] A distilled fraction containing about 70 weight percent 1,2-epoxybutane and about 30 weight percent of mixed 2,3-epoxybutane isomers.

*Example 24*

A first solution was prepared by dissolving 10 grams of calcium metal in approximately 250 cc. of liquid ammonia with stirring. A second solution was prepared by slowly adding 15.5 grams of ethylene glycol to 100 cc. of liquid ammonia. The second solution was then added to the first solution and the excess ammonia was allowed to weather off (overnight). A gray solid product thus was obtained. This product was ground under a nitrogen atmosphere to a fine powdery state. The resulting powdery product was placed in a desiccator and exposed to carbon dioxide saturated with water vapor for a period of 3 to 4 hours. A weight gain of about 50–56 percent was observed in the resulting exposed powdery product. This product was then dried under vacuum at 57° C. until a weight loss of 15–18 percent had occurred in the powdery product.

*Example 25*

To a glass tube containing 0.09 gram of the "exposure activated" calcium glycoxide catalyst prepared as set forth in Example 24 supra, there were charged 1.5 grams of ethylene oxide, 13.5 grams of propylene oxide, and 15 grams of toluene. The tube was sealed and then inserted into an aluminum block which was gently agitated for a period of 144 hours at 90° C. After this period of time, the tube was broken open and the reaction product was washed with about 100 milliliters of hexane. A seven gram yield of white, insoluble solid polymer having a reduced viscosity in benzene of 1.35 was obtained.

When an equivalent amount of cyclohexene oxide is substituted for ethylene oxide in the above reaction, a solid, water-insoluble copolymer is obtained.

*Example 26*

To a glass tube containing 0.1 gram of the "exposure activated" calcium glycoxide catalyst prepared as set forth in Example 24 supra, there were charged 6 grams of ethylene oxide, 9 grams of 1,2-epoxydodecane, and 15 grams of toluene. The tube was sealed and then inserted into an aluminum block which was gently agitated for a period of 187 hours at 90° C. After this period of time the tube was broken open and the reaction product was washed with about 100 milliliters of hexane. There was obtained 8 grams of a white, solid polymer which had a reduced viscosity in benzene of 0.4.

When an equivalent amount of propylene oxide is substituted for ethylene oxide in the above reaction, a solid, water-insoluble copolymer is obtained.

*Example 27*

In this example five different experiments were conducted in which five 30 gram admixtures of ethylene oxide and propylene oxide were copolymerized in the presence of 0.03 gram of the "exposure activated" calcium glycoxide prepared as set forth in Example 24 supra. The polymerization reactions were conducted at about 90° C. for 67 hours. After this period of time, the tubes were broken open and the reaction product was washed with heptane, followed by drying under vacuum at 40° C. The reduced viscosity of the polymer product was determined in acetonitrile. Samples of the five copolymer products then were separately dissolved in benzene to give solutions containing 5 weight percent copolymer, based on the solution weight. Each of the five solutions then was cast on to separate glass plates to give a film approximately 15 mils thick. These coated plates or panels were allowed to air-dry for about 4–5 hours, followed by oven-drying (forced convection) for about 30 to 60 minutes at 50° C. The resulting films on each of the five glass panels were approximately 4 to 5 mils in thickness. The pertinent data and results are set forth in Table IX below.

TABLE IX

|  | 1 | 2 | 3 | 4 | Percent |
|---|---|---|---|---|---|
| Wt. Percent Propylene Oxide | 30 | 40 | 45 | 50 | 60 |
| Wt. Percent Ethylene Oxide | 70 | 60 | 55 | 50 | 40 |
| Percent Conversion | 93 | 93 | 74 | 93 | 90 |
| Reduced Viscosity | 1.9 | 1.9 | 3.2 | 1.7 | 1.4 |
| Appearance of Film | Dry | Dry | Slightly tacky | Tacky | Tacky |

It is readily apparent from the data in Table IX that as the propylene oxide content in the copolymer product was increased, the film characteristics became progressively poorer. Those films prepared from copolymers containing above about 55 weight percent ethylene oxide could be hand pulled from the glass panel as a self supporting film. As the ethylene oxide content in the copolymer was progressively increased the resulting film characteristics likewise were progressively more desirable. The copolymers containing 50 and 60 weight percent propylene oxide gave films that were waxy to semi-solid which films could not be stripped from the glass panels.

*Examples 28–39*

To a 3-liter resin flask fitted with a stirrer, thermometer, reflux condenser, a nitrogen inlet tube, and a liquid inlet tube was added 1700 ml. purified isooctane under a nitrogen atmosphere which was maintained throughout the entire reaction. The stirred reaction vessel was heated to 40° C. and then a 30 ml. portion of a uniform mixture of 17.5 ml. of purified 1,2-butylene oxide and 332.5 ml. of purified ethylene oxide was added. A quantity of calcium amide catalyst modified with acetonitrile and propylene oxide (whose preparation is described in U.S. Patent 2,969,402) containing 1.0 gram of calcium calculated as the metal, was then added. The remainder of the oxide monomer mixture was then slowly fed to the polymerization during the next six hours. A few minutes after the catalyst addition, the temperature of the reaction mixture had risen to 45° C., where it was maintained by external cooling (or occasional heating when necessary), for the duration of the reaction. One half-hour after the oxide feed was complete, the reaction mixture was cooled to less than 35° C., and the polymer was then isolated by filtration and drying under vacuum. Thus was obtained 217 grams of white granular copolymer, which had a reduced viscosity in acetonitrile of 12.2.

In a manner similar to that described above, the following additional copolymer resins were prepared and tested, after being converted into film by a conventional calendering process using no plasticizer or stress-relieving agent, with the only additive used being a small amount of phenothiazine, a heat stabilizer. These examples are summarized in Table X below:

TABLE X.—PHYSICAL PROPERTIES OF FILMS PREPARED FROM ETHYLENE OXIDE COPOLYMERS

| Examples | Comonomer | Weight Percent Comonomer Feed | $I_R$ [1] | Film Direction [2] | Tensile Strength [3] | | Ultimate [4] Elongation | Tensile Impact Strength, ft.-lbs. per cubic inch | Stress Endurance, Hours |
|---|---|---|---|---|---|---|---|---|---|
| | | | | | Yield | Ultimate | | | |
| 28 | 1,2-butylene oxide | 5 | 12.2 | L | 1,200 | 1,500 | 458 | | 263 |
| 29 | Styrene oxide | 1.2 | 8.6 | L | 1,405 | 1,800 | 450 | 521 | 184 |
| | | | | T | 1,450 | 1,950 | 470 | 584 | |
| 30 | do | 4.1 | 8.5 | L | 1,110 | 2,650 | 775 | 1,043 | 640 |
| | | | | T | 1,200 | 2,930 | 800 | 972 | |
| 31 | do | 5.9 | 7.9 | L | 1,060 | 2,430 | 783 | 1,060 | 570 |
| | | | | T | 1,180 | 2,700 | 780 | 1,030 | |
| 32 | do | 8.8 | 6.3 | L | 780 | 2,170 | 800 | 1,062 | 184 |
| | | | | T | 950 | 2,350 | 760 | 1,070 | |
| 33 | do | 12 | 5.5 | L | 630 | 1,070 | 470 | 958 | 570 |
| | | | | T | 795 | 1,430 | 590 | 633 | |
| 34 | Propylene oxide | 10 | | L | 896 | 550 | 323 | 197 | 317 |
| | | | | T | 863 | 804 | | | |
| 35 | N-glycidyldiethyl amine | 5 | 5.5 | L | 1,440 | 1,570 | 466 | 343 | |
| | | | | T | 1,530 | 1,950 | 532 | | 336 |
| 36 | {1,2-butylene oxide / styrene oxide} | 5 / 5.9 | 3.6 | L | 815 | 1,770 | 723 | 607 | |
| | | | | T | 1,090 | 1,670 | 497 | | 262 |
| 37 | {propylene oxide / 1,2-butylene oxide} | 2.5 / 2.5 | 5.9 | L | 1,190 | 1,510 | 522 | 405 | |
| | | | | T | 1,390 | 2,050 | 657 | | 670 |
| 38 | {propylene oxide / styrene oxide} | 2.5 / 3.0 | 5.5 | L | 1,100 | 2,180 | 716 | 571 | |
| | | | | T | 1,240 | 2,065 | 638 | | 670 |
| 39 | Control [5] | | | L | 1,225 | 1,400 | 497 | 403 | 3.0 |
| | | | | T | 1,365 | 1,490 | 493 | 314 | 2.1 |

[1] Reduced viscosity.
[2] L=longitudinal, T=transverse.
[3] In pounds per square inch.
[4] In percent.
[5] Homopolymer of ethylene oxide having a reduced viscosity of at least 1.0.

Although the invention has been illustrated by the preceding examples, it is not to be construed as limited to the materials employed therein, but rather, the invention encompasses the generic area as hereinbefore disclosed. Various modifications and embodiments of this invention can be made without departing from the spirit and scope thereof.

What is claimed is:

1. A solid random interpolymer of about 90 to about 99 weight percent ethylene oxide and about 10 to about 1 weight percent of at least one different 1,2-alkylene oxide, said interpolymer having a reduced viscosity of at least about 1 as measured at a concentration of 0.2 gram of interpolymer in 100 milliliters of acetonitrile at 30° C.

2. A solid random interpolymer of about 90 to about 99 weight percent ethylene oxide and about 10 to about 1 weight percent propylene oxide, said interpolymer having a reduced viscosity of at least about 1 as measured at a concentration of 0.2 gram of interpolymer in 100 milliliters of acetonitrile at 30° C.

3. A solid random interpolymer of about 90 to about 99 weight percent ethylene oxide and about 10 to about 1 weight percent 1,2-butylene oxide, said interpolymer having a reduced viscosity of at least about 1 as measured at a concentration of 0.2 gram of interpolymer in 100 milliliters of acetonitrile at 30° C.

4. A solid random interpolymer of about 90 to about 99 weight percent ethylene oxide and about 10 to about 1 weight percent styrene oxide, said interpolymer having a reduced viscosity of at least about 1 as measured at a concentration of 0.2 gram of interpolymer in 100 milliliters of acetonitrile at 30° C.

5. A solid random interpolymer of about 90 to about 99 weight percent ethylene oxide and about 10 to about 1 weight percent of a mixture of propylene oxide and 1,2-butylene oxide, said interpolymer having a reduced viscosity of at least about 1 as measured at a concentration of 0.2 gram of interpolymer in 100 milliliters of acetonitrile at 30° C.

6. A solid random interpolymer of about 90 to about 99 weight percent ethylene oxide and about 10 to about 1 weight percent of a mixture of propylene oxide and styrene oxide, said interpolymer having a reduced viscosity of at least about 1 as measured at a concentration of 0.2 gram of interpolymer in 100 milliliters of acetonitrile at 30° C.

7. A solid random interpolymer of about 90 to about 99 weight percent ethylene oxide and about 10 to about 1 weight percent of a mixture of 1,2-butylene oxide and styrene oxide, said interpolymer having a reduced viscosity of at least about 1 as measured at a concentration of 0.2 gram of interpolymer in 100 milliliters of acetonitrile at 30° C.

8. A solid random interpolymer of about 90 to about 99 weight percent ethylene oxide, about 5 to about 0.5 weight percent 1,2-butylene oxide, and about 5 to about 0.5 weight percent styrene oxide, said interpolymer having a reduced viscosity of at least about 1 as measured at a concentration of 0.2 gram of interpolymer in 100 milliliters of acetonitrile at 30° C.

9. A water soluble article of manufacture of the class consisting of films, sheets and molded articles, said article of manufacture comprised of a solid random interpolymer of about 90 to about 99 weight percent ethylene oxide and about 10 to about 1 weight percent of at least one different 1,2-alkylene oxide, said interpolymer having a reduced viscosity of at least about 1 as measured at a concentration of 0.2 gram of interpolymer in 100 milliliters of acetonitrile at 30° C.

10. A water soluble article of manufacture of the class consisting of films, sheets and molded articles, said article of manufacture comprised of a solid random interpolymer of about 90 to about 99 weight percent ethylene oxide and about 10 to about 1 weight percent of a mixture of 1,2-butylene oxide and styrene oxide, said interpolymer having a reduced viscosity of at least about 1 as measured at a concentration of 0.2 gram of interpolymer in 100 milliliters of acetonitrile at 30° C.

References Cited by the Examiner

UNITED STATES PATENTS

| | | | |
|---|---|---|---|
| 2,641,614 | 5/1953 | Britton et al. | 260—2 |
| 2,674,619 | 4/1954 | Lunsted | 260—2 |
| 2,706,181 | 4/1955 | Pruitt et al. | 260—2 |
| 2,786,080 | 3/1957 | Patton | 260—2 |
| 3,029,216 | 4/1962 | Bailey et al. | 260—2 |

FOREIGN PATENTS 443,632   2/1936   Great Britain.

WILLIAM H. SHORT, *Primary Examiner.*

S. N. RICE, *Assistant Examiner.*